United States Patent [19]

Hirooka et al.

[11] Patent Number: 4,559,260

[45] Date of Patent: Dec. 17, 1985

[54] IMAGE HOLDING MEMBER HAVING PROTECTIVE LAYERS

[75] Inventors: Masaaki Hirooka, Toride; Hitoshi Toma, Kawasaki; Hideyo Kondo, Toride, all of Japan

[73] Assignee: Canon Kabushiki Kaisha, Tokyo, Japan

[21] Appl. No.: 445,477

[22] Filed: Nov. 30, 1982

Related U.S. Application Data

[63] Continuation of Ser. No. 251,089, Apr. 6, 1981, abandoned, which is a continuation of Ser. No. 81,463, Oct. 3, 1979, abandoned.

[30] Foreign Application Priority Data

Oct. 14, 1978 [JP] Japan ................................ 53-126700

[51] Int. Cl.[4] ........................... B32B 7/00; G03G 5/14

[52] U.S. Cl. ....................................... 428/215; 430/66; 430/961

[58] Field of Search ..................... 430/60, 66, 67, 961, 430/534, 536, 537; 428/515, 215

[56] References Cited

U.S. PATENT DOCUMENTS

| | | | |
|---|---|---|---|
| 2,901,349 | 8/1959 | Schaffert et al. | 430/67 |
| 3,904,406 | 9/1975 | Takahashi | 430/67 X |
| 4,012,255 | 3/1977 | McMullen | 428/327 X |
| 4,032,684 | 6/1977 | Dunnington et al. | 428/332 |
| 4,123,278 | 10/1978 | Paesschen et al. | 430/535 |

FOREIGN PATENT DOCUMENTS

| | | | |
|---|---|---|---|
| 77632 | 7/1978 | Japan | 430/67 |

OTHER PUBLICATIONS

Def. Publication, O'Neill, T871,004, 2/10/70, 871 O.G.353.

*Primary Examiner*—John D. Welsh

*Attorney, Agent, or Firm*—Fitzpatrick, Cella, Harper & Scinto

[57] ABSTRACT

An image holding member for electrostatic images or toner images has a three-layered insulating layer at the surface. The insulating layer is composed of an upper layer mainly composed of an organic solvent soluble thermoplastic resin, an intermediate layer mainly composed of an organic solvent soluble thermoplastic resin and a cured thermosetting resin, and a lower layer mainly composed of a cured thermosetting resin.

7 Claims, No Drawings

IMAGE HOLDING MEMBER HAVING PROTECTIVE LAYERS

This is a continuation, of application Ser. No. 251,089, filed Apr. 6, 1981; which application in turn is a continuation of application Ser. No. 81,463, filed Oct. 3, 1979, both abandoned.

BACKGROUND OF THE INVENTION

1. Field of the Invention

This invention relates to an image holding member for holding electrostatic images or toner images.

2. Description of the Prior Art

Electrostatic images or toner images can be formed by various processes. As image holding member on which electrostatic images or toner images are formed, there may be mentioned an image holding member called "electrophotographic photosensitive member" having a photoconductive layer and an image holding member having no photoconductive layer.

An image holding member is usually composed of a support and an image holding layer overlying the support.

An electrophotographic photosensitive member may be in various forms depending upon the desired characteristics and the kind of electrophotographic process to be applied. Representative electrophotographic photosensitive members are a photosensitive member composed of a support and a photoconductive layer is an image holding layer and a photosensitive member composed of a photoconductive layer as an image holding layer and an insulating layer thereon. These electrophotographic photosensitive members are widely used.

A photosensitive member composed of a support and a photoconductive layer may be used for forming images by a most popular electrophotographic process, i.e., charging, imagewise exposure and developing, if desired, transferring the images.

The insulating layer of a photosensitive layer having an insulating layer serves to protect the photoconductive layer, improve mechanical strength of the photoconductive layer and dark decay characteristics, or fits the photosensitive member to a particular photographic process. Representative photosensitive members having such insulating layer and electrophotographic processes using such photosensitive members are disclosed in Japanese Patent Publication No. 16429/1966 and U.S. Pat. Nos. 2,860,048, 3,146,145, 3,607,258, 3,666,363, 3,734,609, 3,457,070 and 3,124,456.

An electrophotographic process is applied to the electrophotographic photosensitive member to produce electrostatic images and the electrostatic images are visualized by development.

Representative image holding members having no photoconductive layer are those having an insulating layer as an image holding layer. Representative usages of such image holding member are as shown below.

(1) For example, Japanese Patent Publication Nos. 7115/1957, 8204/1957 and 1559/1968 disclose an electrophotographic process comprising transferring electrostatic images formed on an electrophotographic photosensitive member, developing the electrostatic images and then transferring the toner images thus developed to a recording member for the purpose of improving repeatability of using the electrophotographic photosensitive member. An image holding member used for this process is an example of the image holding member having no photoconductive layer.

(2) For example, U.S. Pat. Nos. 3,680,954 and 3,645,614 and U.S. Ser. No. 771,309 filed on Feb. 23, 1977 disclose another electrophotographic process comprising forming electrostatic images on an image holding member having no photoconductive layer corresponding to electrostatic images formed on an electrophotographic photosensitive member. To an electrophotographic photosensitive member in a form of a screen having many fine openings is applied a particular electrophotographic process to produce electrostatic images, and a corona charging treatment is applied to the image holding member having no photoconductive layer by means of the electrostatic images, and the ion stream of corona is modulated to produce electrostatic images on the image holding member having no photoconductive layer followed by developing with toner, and then the images thus developed are transferred to a recording member to produce final images. The image holding member used in this electrophotogrphic process is another example of the image holding member having no photoconductive layer.

(3) Further, according to the other electrophotographic process, toner images formed on an electrophotograhic photosensitive member or an image holding member having no photoconductive layer are not directly transferred to a recording member, but to the other image holding member having no photoconductive layers, and then the toner images thus transferred are transferred to a recording member and fixed. The image holding member used in the above mentioned electrophotographic process is also an example of the image holding member having no photoconductive layer.

This electrophotographic process is particularly suitable for producing color images or high speed copying. Recording members are usually composed of a highly flexible material of less dimensional stability such as paper, film and the like. Therefore, a process comprising transferring each of three colors to a recording member subsequently by registering cannot produce exactly registered three color images. It is preferable to transfer the three colors to an image holding member composed of a material which is substantially free from deformation and then transferring the resulting three-colored images at once to a recording member. This process can produce more exactly registered color images.

Further, it is effective for high speed copying to transfer toner images to a recording member by means of an image holding member.

(4) A still further process comprises applying an electric signal to a multiple stylus electrode to produce electrostatic images on the surface of an image holding member having no photoconductive layer in accordance with the electric signals and developing the electrostatic images. The image holding member used in this process is also an example of the image holding member having no photoconductive layer.

Image holding members used for electrophotography are subjected to various electrical and mechanical forces such as corona charging treatment, cleaning, developing and the like so that they are often damaged. And once image holding members are damaged, image quality formed is remarkably lowered. Therefore, an image holding member is strongly demanded which has excellent electric impact resistance and mechanical impact resistance and further excellent electric charge retentivity. However, such excellent image holding members have not been produced.

SUMMARY OF THE INVENTION

An object of the present invention is to provide an image holding member of excellent durability.

Another object of the present invention is to provide an image holding member having an insulating layer of good cleaning property.

A further object of the present invention is to provide an image holding member of excellent mechanical strength.

According to the present invention, there is provided an image holding member for holding electrostatic images or toner images which comprises, at the surface, a three-layered insulating layer comprising an upper layer mainly composed of an organic solvent soluble thermoplastic resin, an intermediate layer mainly composed of an organic solvent soluble thermoplastic resin and a cured thermosetting resin, and a lower layer mainly composed of a cured thermosetting resin.

DESCRIPTION OF THE PREFERRED EMBODIMENTS

The upper layer of the insulating layer of image holding member according to the present invention is mainly composed of an organic solvent soluble thermoplastic resin, and the upper layer has excellent surface lubricating property, release and humidity resistance. Therefore, the surface of the insulating layer has high durability, cleaning property, and electric charge retentivity.

The lower layer of the insulating layer is mainly composed of a cured thermosetting resin and contributes to improving the mechanical strength of the whole insulating layer, in particular, preventing formation of press mark on the photoconductive layer caused by mechanical impact to protect the photoconductive layer.

The intermediate layer mainly composed of an organic solvent soluble thermoplastic resin and a cured thermosetting resin can strongly integrate the upper layer and the lower layer to serve for producing a photosensitive member having excellent durability. In particular, the effect of the intermediate layer in the present invention is remarkable and contributes to good characteristics of a photosensitive member. On the contrary, when the upper layer and the lower layer are directly laminated, the adhesion strength between the two layers is not sufficient and the exfoliation of the two layers deteriorates durability of the photosensitive member, but when the intermediate layer composed of a mixture of a thermoplastic resin and a cured thermosetting resin is intervened between the two layers, lowering of the adhesion strength can be improved, and characteristics of each of the lower layer and the upper layer effectively contribute to durability of the photosensitive member.

Preferable thermoplastic resins used for forming the upper layer and the lower layer are resins of linear structure such as polyester, phenoxy resins, polystyrene, polyvinyl chloride, cellulose, polyvinyl acetate, vinyl chloride-vinyl acetate copolymer, polyacrylic acid ester, polyolefin, thermoplastic urethane and the like.

If desired, a lubricating agent may be added so as to improve further the surface lubricating property and further, if desired, a surface active agent for dispersing the lubricating agent may be added.

As the lubricating agent, there may be appropriately used powders having lubricating effect.

Representative lubricating agents are lubricating agents substantially insoluble in a usual solvent such as polyethylene, polytetrafluoroethylene, polyethylene terephthalate, polyvinylidene fluoride, polyvinyl chloride, metal salts of stearic acid, paraffin wax, talc and the like.

Particle size of the lubricating agent is usually less than 10 microns of primary particle size, preferably less than 5 microns.

Amount of the lubricating agent to be added may be appropriately set, and it is usually 0.5—90% by weight, preferably, 5—50% by weight.

As the surface active agent, there may be used various surface active agents. In particular, fluorine containing surface active agents are effective. Fluorine containing surface active agents are surface active agents of a molecule having a highly fluorinated long alkyl group.

Representative fluorine containing surface active agents are:

$C_8F_{17}SO_2.NRCH_2COOK$,
$C_8F_{17}SO_2.NRCH_2CH_2O(CH_2CH_2O)_nH$ where n is 5, 10 or 15, $C_8F_{17}SO_2N(CH_2CH_2CH_2OH)_2$,
$C_8F_{17}RO(CH_2CH_2O)_n$ *where n is* 5—20,
$C_{16}F_{34}(R\text{–}O)_n$ wherein n is 5-20,
$C_{16}F_{34}(R\text{–}O)_nR$ where n is 5-20, and the like. In the above formulas, R is alkyl such as methyl, ethyl, propyl, butyl and the like, and aryl such as phenyl, naphthyl and the like.

The fluorine containing surface active agent is usually contained in an amount of 0.5-50%, preferably 1-30% by weight.

Thickness of the upper layer may be appropriately set. It is usually 2-40 microns, preferably, 4-20 microns. Hardness of the upper layer is preferably pencil hardness of 1-3H.

The thermosetting resins contained in the intermediate layer and the lower layer are resins which can be cured by heat, light, electron ray and the like. Some thermosetting resins can be cured even at room temperature upon curing without heating.

Representative thermosetting resins are acrylic resins, urethane resins, polyester resins, epoxy resins, melamine resins, silicone resins and the like.

The intermediate layer is mainly composed of the thermoplastic resin and the cured thermosetting resin. Ratio of the two resins are selected appropriately taking into consideration the adhesion strength between the upper layer and the lower layer, solvent resistance with respect to a solvent used for coating the upper layer, mutual solubility of the two resins and the like. The ratio by weight of the thermoplastic resin to the cured thermosetting resin is usually from 8 : 2 to 2 : 8, preferably, from 3:7 to 5:5. As to mutual solubility, a combination of curable acrylic acid ester resin and vinyl chloride-vinyl acetate copolymer is very good.

Thickness of the intermediate layer may be appropriately selected, and it is preferably 1-35 microns.

The thermoplastic resin and the cured thermosetting resin may be the same as or different from those used in the upper layer and the lower layer.

Thickness of the lower layer may be appropriately selected. It is usually 2–20 microns, preferably 4–15 microns. Hardness of the lower layer is preferably pencil hardness of 2–4H.

Formation of the insulating layer by coating is better than that by adhering an insulating film. A seamless insulating layer can be produced in case of a drum type of an image holding member by coating.

When the image holding member is an electrophotographic photosensitive member, the most representative structure is a laminate comprising a photoconductive layer disposed between a support and an insulating layer.

The support may be composed of an optional material such as stainless steel, copper, aluminum, tin and the like metal plate, and paper, resin film and the like. If desired, the support may be omitted.

The photoconductive layer may be produced by vacuum vapor deposition of an inorganic photoconductive material selected from S, Se, PbO, alloys containing S, Se, Te, As, Sb or the like and intermetallic compounds. In case of a sputtering method, the photoconductive layer may be produced by attaching a photoconductive material of a high melting point such as ZnO, CdS, CdSe, $TiO_2$ and the like to a support. In case of a coating method, there may be used an organic photoconductive material such as polyvinyl carbazole, anthracene, phthalocyanine and the like, such organic photoconductive material which is dye-sensitized or sensitized by a Lewis acid, or a mixture of the organic photoconductive material and an insulating binder. In addition, a mixture of an insulating binder and an inorganic photoconductive material such as ZnO, CdS, $TiO_2$, PbO and the like can be employed.

As an insulating binder, there may be used various resins.

Thickness of the photoconductive layer may vary depending upon the type and characteristics of the photoconductive material. In general, it is 5–100 microns, preferably 10–50 microns.

A resin layer may be intervened between the insulating layer and the photoconductive layer. Examples of particularly effective resin layers are layers of a resin having acid group such as carboxyl, sulfonic acid group and the like. Representative ones are vinyl acetate-acrylic acid copolymer, vinyl chloride-vinyl acetate-acrylic acid terpolymer, ethyleneacrylic acid copolymer, styrene-acrylic acid copolymer, butadiene-acrylic acid copolymer, $\alpha$, $\omega$-polybutadiene dicarboxylic acid, vinyl acetate-ethylene sulfonic acid copolymer, styrene-ethylene sulfonic acid copolymer and the like.

These resins can be generally made water soluble or dispersable in water as fine paricles by neutralizing with alkali.

As the alkali, there can be used volatile alkalis such as ammonia, methylamine, dimethylamine, trimethlamine, ethylamine, diethylamine, triethylamine and the like. When the alkalis are used, the resulting resin layer is heated to a temperature higher than the boiling point of the volatile alkali to remove the alkali. This procedure is desirable and effective when the photoconductive layer is poor at organic solvent resistance.

The most representative structure of an image holding member without a photoconductive layer is that composed of an insulating layer overlying a support.

The insulating layer is relatively thin where it is used mainly for the purpose of protection of the image holding member and improving durability and dark decay characteristics of the image holding member. On the contrary, the insulating layer is relatively thick where the image holding member is used for a particular electrophotographic process.

Thickness of the insulating layer is usually 5–70 microns, in particular, 10–50 microns.

EXAMPLE 1

100 parts by weight (hereinafter, part or parts are by weight unless otherwise specified of CdS powder, 15 parts of curable cyclized butadiene rubber (i.e., a cyclized polybutadiene rubber supplied by Japan Synthetic Rubber Co. under the tradename "CBR"; glass transition temperature $=5°$ C.; volume resistivity $=9\times10^{15}$ ohm-cm; tensile strength $=0.4$–$0.6$ kg/mm$^2$; insoluble in alcohols and ketones; soluble in aromatic solvents; molecular weight— 100,000–120,000) as a binder and 1 part of a diazo curing agent were thoroughly mixed, passed through a roll mill of 40 microns gap five times to mix CdS and the binder thoroughly, and then the resulting mixture is mixed with toluene to produce a liquid composition having a viscosity of 800 cps. An aluminum drum support of 30 cm. long was soaked in the liquid composition, pulled up at a speed of 30 mm./min., and cured by heating at 150° C. for 30 min. to form a photoconductive layer of 50 microns thick. On the resulting photoconductive layer was formed a coating of an acrylic acid ester resin of a light curing type (i.e., an acrylate polyester oligomer available from Toa Goesi Kagaku under the tradename "Aronix 8060"; glass transition temperature $=45°$ C.; volume resistivity $=9\times10^{15}$ ohm-cm; tensile strength $=2$–$3$ kg/mm$^2$; insoluble in alcohols, aromatic solvents and ketones; molecular weight $=2000$–$4000$); by a soaking method to produce a lower layer of 15 microns thick, which was cured by irradiation of a 4 KW mercury lamp for 2 minutes.

On the resulting lower layer was formed an intermediate layer as follows. A solution of vinyl chloride-vinyl acetate copolymer (i.e., a vinyl chloride-vinyl acetate copolymer available from Union Carbide under the tradename "VMCH"; volume resistivity $=7\times10^{16}$ ohm-cm; tensile strength $=0.3$–$0.8$ kg/mm$^2$; insoluble in alcohols, slightly soluble in aromatic solvents, soluble in ketones; molecular weight—10,000–30,000) in methyl ethyl ketone and a solution of a light curable type acrylic acid ester resin (tradename, "Aronix 8060") in methyl ethyl ketone were mixed at a ratio of 1 : 1 (as resin weight) to produce a liquid coating composition of viscosity of 50 cps. The liquid coating composition was applied to the surface of the lower layer in the thickness of 15 microns by a soaking method and irradiated by a 4 KW mercury lamp for 5 min. to form a cured intermediate layer.

To the surface of the intermediate layer was applied a liquid coating material prepared by dispersing powders (particle size of 0.3 microns) of polytetrafluoroethylene (i.e., a low molecular weight polytetrafluoroethylene supplied by Daikin Kogyo under the tradename "Lubron L-2"; glass transition temperature $=60°$ C.; volume resistivity—$3\times10^{15}$ ohm-cm; tensile strength $=1.5$–$1.9$ kg/mm$^2$; insoluble in solvents; molecular weight $=50,000$–$100,000$) as a lubricating agent in a solution of vinyl chloride-vinyl acetate copolymer (tradename, VMCH) in methyl ethyl ketone together with a surface active agent (i.e., a fluorine-containing surfactant available from Sumitomo 3M under the tradename "FC-431"; glass transition temperature $=-10°$ C.; volume resistivity $=5\times10^{12}$ ohm-cm; insoluble in alcohols and ketones; molecular weight =4,000–6,000), by using a ball mill pot. The application was effected by soaking to form a coating film of 7 micons thick, which was dried at 75° C. for 10 minutes. Thus the upper layer was formed. The resulting photosensitive member is called "photosensitive member I".

Repeating the above procedures for producing the photosensitive member I except that the upper layer did not contain the lubricating agent and the surface active agent, there was obtained a photosensitive member. It is called "photosensitive member II".

Repeating the above procedures for producing the photosensitive member I except that the intermediate layer was omitted and thickness of the lower layer was 28 microns, there was obtained a photosensitive member. It is called "photosensitive member III".

To the photosensitive members I–III was applied an electrophotographic process comprising primary positive DC charging, secondary AC discharging simultaneously with exposure, blanket exposure, dry development with a positive toner and cleaning treatment with a polyurethane cleaning blade (hardness of 70°, angle against the surface of the insulating layer of 30°, and blade load of 2.0 Kg.) so as to measure durability of the photosensitive members I–III.

The results are as shown below.

With respect to photosensitive member I, even after repeating the electrophotographic process 100,000 times, no exfoliation of the insulating layer of the photosensitive member occurred and the resulting images were still sharp and clear.

With respect to photosensitive member II, even after repeating the electrophotographic process 60,000 times, no exfoliation of the insulating layer of the photosensitive member occurred, but there were formed stripe-like scratches on the surface of the insulating layer and fog was caused by the scratches.

With respect to photosensitive member III, after repeating the electrophotographic process 3,000 times, exfoliation of the upper layer of the insulating layer occurred partly and toner particles adhered to the exfoliated portions so that the resulting images were of far less sharpness.

EXAMPLE 2

Repeating the procedure of Example 1 except that the CdS photoconductive layer of each of photosensitive members I–III was replaced by an Se-Te photoconductive layer, there were produced photosensitive members I', II' and III', which were found to have good durability similar to that of photosensitive members I–III.

The Se-Te photoconductive layer was prepared in the thickness of 65 microns by placing 200 g. of an Se-Te alloy (90:10, weight ratio) on an evaporating dish and conducting vapor-deposition at a temperature of an evaporation source of 320° C., substrate (A1 drum) temperature of 68° C. at a pressure of $1\times10^{-5}$ Torr. for 40 minutes.

EXAMPLES 3–6

On the photoconductive layer as produced by the procedure of Example 1 was formed an insulating layer having a composition as shown in the following examples to produce a photosensitive member. The resulting photosensitive members were compared with the corresponding photosensitive members which does not contain the intermediate layer with respect to durability. Durability of the photosensitive member according to the present invention was 5 times or more that of the photosensitive member excluding an intermediate layer.

EXAMPLE 3

Lower layer: Light curable epoxyacrylic resin (i.e., an epoxy oligomer of the acrylate novolak type available under the tradename "MVVC-Wo-4" from Dainichi Seika; glass transition temperature =43° C.; volume resistivity $=5\times10^{15}$ ohm-cm; tensile strength =1.5–2.5 kg/mm$^2$; insoluble in alcohols, aromatic solvents and ketones; molecular weight =3,000–6,000).

Intermediate layer: Vinyl chloride-vinyl acetate copolymer (tradename, VMCH) and light curable acrylic acid ester resin (tradename, "Aronix 8060") (6:4, by weight).

Upper layer: Vinyl chloride-vinyl acetate copolymer (tradename, VMCH), polytetrafluoroethylene (tradename, "Lubron L-2"), and surface active agent (tradename, "FC-431").

EXAMPLE 4

Lower layer: Light curable epoxyacrylic resin (tradename MVVC-Wo-4).

Intermediate layer: Linear polyester resin (i.e., a polyester derived from terephthalic acid and two or more polymethylene glycols available from Toyobo under the tradename "Vylon-200"; glass transition temperature =67° C.; volume resistivity $=7.2\times10^{16}$ ohm-cm; tensile strength =0.5 kg/mm$^2$; slightly soluble in alcohols and aromatic solvents, and soluble in ketones; molecular weight =15,000 to 20,000) and light curable epoxyacrylic resin (tradename, MVVC-Wo-4) (7:3, by weight).

Upper layer: Linear polyester resin (tradename, "Vylon-200"). Lubricating agent, polytetrafluoroethylene (tradename, "Lubron-2, supplied by Daikin Kogyo).

EXAMPLE 5

Lower layer: Light curable acrylurethane resin (i.e., an acrylate urethane oligomer available under the tradename "Sonne" from Kansai Paint; glass transition temperature =38° C.; volume resistivity $=8\times10^{15}$ ohm-cm; tensile strength—1–2 kg/mm$^2$; insoluble in alcohols, aromatic solvents and ketones; molecular weight =5,000–7,000).

Intermediate layer: Vinyl chloride-vinyl acetate copolymer (tradename, "VMCH") and light curable acrylic acid ester resin (tradename, "Aronix 8060") (5:5, by weight).

Upper layer: Polyether resin (i.e., a polyether resin of the phenoxy series available under the tradename "PKHH" from Union Carbide; volume resistivity $=3\times10^{16}$ ohm-cm; tensile strength =0.4–0.7 kg/mm$^2$; insoluble in alcohols, slightly soluble in aromatic solvents, and soluble in ketones; moleculare weight—10,000–30,000), lubricating agent, polyethylene (2 microns in size), surface active agent, $C_8F_{17}SO_2NC_2H_5CH_2CH_2O(CH_2CH_2O)_{10}H$.

EXAMPLE 6

Lower layer: Thermosetting type acrylic resin (i.e., an acrylate polyester oligomer available under the tradename "Pulslac 2000" from Chugoku Toryo; glass transition temperature $=35°$ C.; volume resistivity $=2\times10^{15}$ ohm-cm; tensile strength—1-2 kg/mm$^2$; insoluble in alchols, aromatic solvents and ketones; molecular weight =2,000–4,000).

Intermediate layer: Cellulose resin (i.e., an ethyl cellulose resin available under the tradename "L-20-AC" from Daiseru: volume resistivity $=4\times10^{14}$ ohm-cm; tensile strength =0.2–0.6 kg/mm$^2$; soluble in alcohols and ketones and slightly soluble in aromatic solvents; molecular weight =30,000–60,000) and thermosetting type acrylic resin (tradename, "Pulslac 2000") (6:4, by weight).

Upper layer: Cellulose resin (tradename, "L-20-AC"), lubricating agent, polybutylene terephthalate (2 microns in size), surface active agent (tradename, "FC-431", supplied by Sumitomo 3M).

EXAMPLE 7

An aluminum drum support (200φ×500 mm) was soaked in a solution of an unsaturated group containing acryl series polyester resin (obtained by treating 180 parts by weight of epichlorohydrin, 90 parts by weight of fumaric acid, 4 parts by weight of diethylaminoethyl methacrylate and 1.0 part by weight of hydroquinone monomethyl ether at 150° C. for 3 hours) in methyl ethyl ketone adjusted to a viscosity of 90 cps. and pulled up at a speed of 30 mm./min., and irradiated by a 4 KW mercury lamp for 5 minutes to cure. Thus a lower layer of 10 microns thick was formed.

Further, an intermediate layer of 2 microns thickness was produced by following the above mentioned procedure using a solution of a light curable acrylurethane resin (tradename, "Sonne") and a polyether resin (tradename, "PKHH") (6:4, by weight) in methyl isobutyl ketone and pulling up at a speed of 23 mm./min.

Then, on the intermediate layer was coated a liquid dispersion containing 80 parts by weight of a vinyl chloride-vinyl acetate copolymer resin (tradename, "VMCH"), 20 parts by weight of polytetrafluoroethylene (tradename, "Lubron L-2", 0.3 microns in size) and 0.2 parts by weight of a surface active agent (tradename, "FC-431") to form an upper layer of 5 microns thickness. Thus an image holding member was produced.

This image holding member was subjected to a process for producing electrostatic images on the member comprising modulating corona discharge by using electrostatic images formed on a CdS screen photosensitive member. Positive dry developer and a urethane cleaning blade (hardness of 70°, an angle against the surface insulating layer of a sample of 30°, and blade pressure of 2.0 Kg) were used to conduct a durability test by developing, transferring and cleaning. The coefficient of friction was 0.90 and the image holding member could smoothly rotate and the resulting images were good. Even after 150,000 revolutions, abrasion of the blade edge portion and scratch on the surface of the image holding member were not observed. Neither was observed exfoliation between the layers of the insulating layer.

The process for measuring durability of the image holding member by using a CdS screen photosensitive member was as shown below. A photoconductive layer of 30 microns thick was formed on a stainless steel wire net (opening width of about 50 microns) by spray coating. Composition of the photoconductive layer was 70 parts by weight of CdS powder and 30 parts by weight of a silicone resin (i.e., a curable methylphenyl silicone available from Shinetsu Silicone under the tradename "KR-255"; glass transition temperature $=10°$ C.; volume resistivity $=4\times10^{15}$ ohm-cm; tensile strength =0.1–0.3 kg/mm$^2$; soluble in ketones and aromatic solvents; molecular weight =5,000–8,000), which were dried at 80° C. for 15 minutes. On the photoconductive layer was formed an insulating layer of 15 microns in thickness by spray coating. The insulating layer was composed of a curing agent (i.e., an -aminopropyltriethoxysilane available from Toshiba Silicone under the tradename "CR-15"; glass transition temperature $=5°$ C.; volume resistivity $=3\times10^{14}$ ohm-cm; molecular weight =250–400) and a silicone resin (i.e., a curable methylphenyl silicone available from Toshiba Silicone under the tradename "TSR-144"; glass transition temperature $=13°$ C.; volume resistivity $=5\times10^{15}$ ohm-cm; tensile strength =0.1–0.3 kg/mm$^2$; soluble in ketones and aromatic solvents; molecular weight =6,000–8,000).

Surface of the resulting screen photosensitive member was charged to +450 V, and imagewise exposed simultaneously with AC discharging to produce electrostatic images of −50 V at the light portion and +200 V at the dark portion. At this state, a sample was placed at the side of the stainless steel wire net of the screen photosensitive member and was subjected to negative corona charging through the screen photosensitive member. And then, electrostatic images formed on the sample was developed, transferred the toner images thus developed to a paper at a transferring voltage of about −6 KV, and fixed to produce visible images.

What we claim is:

1. An image holding member for holding electrostatic images or toner images which comprises at least a support and, at the surface, a three-layered insulating layer comprising an upper layer mainly composed of an organic solvent-soluble thermoplastic resin having a linear molecular structure, an intermediate layer having a thickness of from 1 to 35 microns and being mainly composed of an organic solvent-soluble thermoplastic resin and a cured thermosetting resin, wherein the ratio by weight of said thermoplastic resin to said thermosetting resin is from 8:2 to 2:8 and wherein said thermoplastic resin and said cured thermosetting resin are mutually soluble in each other, and a lower layer mainly composed of a cured thermosetting resin.

2. An image holding member according to claim 1 in which the thickness of the upper layer ranges from 2 to 40 microns.

3. An image holding member according to claim 1 in which the thickness of the lower layer ranges from 2 to 20 microns.

4. An image holding member according to claim 1 further comprising a photoconductive layer on said support and on which said insulating layer is formed.

5. An image holding member according to claim 1 in which the thermoplastic resins for forming the upper layer and the intermediate layer are selected from the group consisting of polyesters, phenoxy resins, polystyrene, polyvinyl chloride, cellulose, polyvinyl acetate, vinyl chloride-vinyl acetate copolymer, polyacrylic acid esters, polyolefins, and thermoplastic urethane.

6. An image holding member according to claim 1 in which the thermosetting resins for forming the intermediate layer and the lower layer are selected from the group consisting of acrylic resins, urethane resins, polyester resins, epoxy resins, melamine resins and silicone resins.

7. An image holding member according to claim 1 in which the upper layer contains a lubricating powder.

* * * * *

UNITED STATES PATENT AND TRADEMARK OFFICE

CERTIFICATE OF CORRECTION

PATENT NO. : 4,559,260

DATED : Dec. 17, 1985

INVENTOR(S) : Masaaki Hirooka, et al.

It is certified that error appears in the above-identified patent and that said Letters Patent is hereby corrected as shown below:

Column 1, line 16, "member" should be --members--.
Column 1, line 30, "is an" should be --as an--.
Column 1, line 41, "photosensitive layer" should be --photosensitive member--.
Column 1, line 48, "members" should be --layer--.
Column 2, line 30, "layers," should be --layer,--.
Column 4, line 33, "n <u>where n is</u> 5-20," should be --n where n is 5-20,--.
Column 5, line 18-19, "like/metal plate," should be --like, metal plate,--.
Column 5, line 50, "ethyleneacrylic" should be --ethylene-acrylic--.
Column 6, line 13, "specified of" should be --specified) of--
Column 6, line 17, "=5°C.;" should be --=-5°C.;--.
Column 6, line 20, "weight-100,000" should be --weight=100,000--.
Column 6, line 64, "resistivity-3" should be --resistivity=3--.
Column 7, line 8, "micons" should be --microns--.
Column 8, line 3, "does not" should be --do not--.
Column 8, line 48, "strength-1-2" should be --strength=1-2--.
Column 8, line 60, "moleculare" should be --molecular--.
Column 9, line 2, "strength-1-2" should be --strength=1-2--.

Signed and Sealed this

Sixteenth Day of December, 1986

*Attest:*

DONALD J. QUIGG

*Attesting Officer* *Commissioner of Patents and Trademarks*